United States Patent [19]
Yost

[11] Patent Number: 5,091,082
[45] Date of Patent: Feb. 25, 1992

[54] APPARATUS FOR DIVERTING FLUID-ENTRAINED SOLIDS AROUND A CENTRIFUGAL PUMP

[76] Inventor: Ken L. Yost, P.O. Box 923, Orangevale, Calif. 95662

[21] Appl. No.: 639,150

[22] Filed: Jan. 9, 1991

Related U.S. Application Data

[63] Continuation-in-part of Ser. No. 406,821, Sep. 13, 1989, abandoned, which is a continuation of Ser. No. 174,876, Mar. 29, 1988, abandoned, which is a continuation-in-part of Ser. No. 45,365, May 1, 1987, Pat. No. 4,740,317.

[51] Int. Cl.$^5$ .............................. B01D 35/02
[52] U.S. Cl. .................. 210/196; 210/416.1; 210/511; 406/93; 406/97; 406/105; 406/153; 406/194; 415/121.2; 417/84
[58] Field of Search .............. 210/196, 197, 209, 299, 210/306, 409, 411, 412, 416.1, 416.5, 425, 427, 429, 432, 435, 445, 446, 449, 451, 511; 55/261, 434, 431; 209/143, 155, 156, 158, 639; 406/93, 97, 105, 153, 171, 194, 197; 415/121.2; 417/84

[56] References Cited

U.S. PATENT DOCUMENTS

| 628,187 | 7/1899 | Sibley . | |
|---|---|---|---|
| 748,821 | 1/1904 | Wackerow . | |
| 1,224,350 | 5/1917 | Adams . | |
| 1,614,770 | 1/1927 | Ayling . | |
| 1,977,601 | 10/1934 | Winton | 210/167 |
| 2,658,622 | 11/1953 | Thornhill | 210/167 |
| 3,149,885 | 9/1965 | Walsh | 406/173 |
| 3,184,973 | 5/1965 | Bradley | 73/422 |
| 3,246,749 | 4/1966 | Moser | 209/12 |
| 3,414,129 | 12/1968 | Going et al. | 210/82 |
| 3,425,078 | 2/1969 | Lazaga | 15/3 |
| 3,520,643 | 7/1970 | Busse et al. | 417/434 |
| 3,540,073 | 11/1970 | Issenmann et al. | 15/340 |
| 3,545,011 | 12/1970 | Helke et al. | 4/10 |
| 3,811,571 | 5/1974 | Woods et al. | 210/136 |
| 3,837,497 | 9/1974 | Smith | 210/349 |
| 3,996,136 | 12/1976 | Jakubek et al. | 210/86 |
| 4,092,248 | 5/1978 | Lamb | 210/152 |
| 4,161,448 | 7/1979 | Erickson et al. | 210/258 |
| 4,264,446 | 4/1981 | Fregeau | 210/356 |
| 4,388,968 | 6/1983 | Brandell | 166/236 |
| 4,543,114 | 9/1985 | Beattie et al. | 55/418 |
| 4,637,825 | 1/1987 | Howeth | 55/302 |
| 4,666,347 | 5/1987 | Janssen | 406/144 |
| 4,678,589 | 7/1987 | Ayres | 210/797 |
| 4,681,609 | 7/1987 | Howeth | 55/302 |
| 4,740,317 | 4/1988 | Yost | 210/798 |
| 4,772,380 | 9/1988 | Cramer et al. | 209/2 |

FOREIGN PATENT DOCUMENTS

| 915631 | 11/1972 | Canada . |
| 0163878 | 5/1984 | European Pat. Off. . |
| 0163879 | 5/1984 | European Pat. Off. . |
| 3521852 | 1/1987 | Fed. Rep. of Germany . |
| 3525230 | 1/1987 | Fed. Rep. of Germany . |
| 2564745 | 5/1985 | France . |
| 231737 | 1/1986 | German Democratic Rep. . |
| 57-053213 | 3/1982 | Japan . |
| 58-124507 | 7/1983 | Japan . |
| 59-019586 | 2/1984 | Japan . |
| 59-066317 | 4/1984 | Japan . |
| 61-200823 | 9/1986 | Japan . |
| 61-249514 | 11/1986 | Japan . |
| 8006308 | 6/1982 | Netherlands . |
| 1039525 | 9/1983 | Sweden . |
| 8207377 | 7/1984 | Sweden . |
| 2903412 | 12/1981 | U.S.S.R. . |
| 1242210 | 7/1986 | U.S.S.R. . |
| 2154892 | 9/1985 | United Kingdom . |

*Primary Examiner*—W. Gary Jones
*Assistant Examiner*—Matthew O. Savage
*Attorney, Agent, or Firm*—Limbach & Limbach

[57] ABSTRACT

The present invention provides an apparatus and method for the separation of solids entrained in fluid streams. The apparatus consists of a pipecross chamber which is divided into two regions by a perforated deflector/separator plate angularly disposed within the chamber. A shear jet is disposed perpendicular to the flow path and higher pressure fluid is thereby injected into the chamber to deflect and separate entrained solids. Embodiments are disclosed in which no deflector/separator plate is disposed within the chamber, separation being effected by the shear jet alone. In preferred embodiments the apparatus and method are used to protect a centrifugal pump impeller from damage by the solids. While conventional pipe joints and parts can be used, an alternate embodiment provides removable side plates and a removable deflector/separator plate for ease of installation and maintenance. Further enhancements include pipe elbow means having a jet in the direction of fluid flow through the elbow. A still further embodiment of the present invention includes a perforated pipe contained within a sealable tank which is by at least one pressurized jet connected to said perforated pipe within said sealable tank.

2 Claims, 8 Drawing Sheets

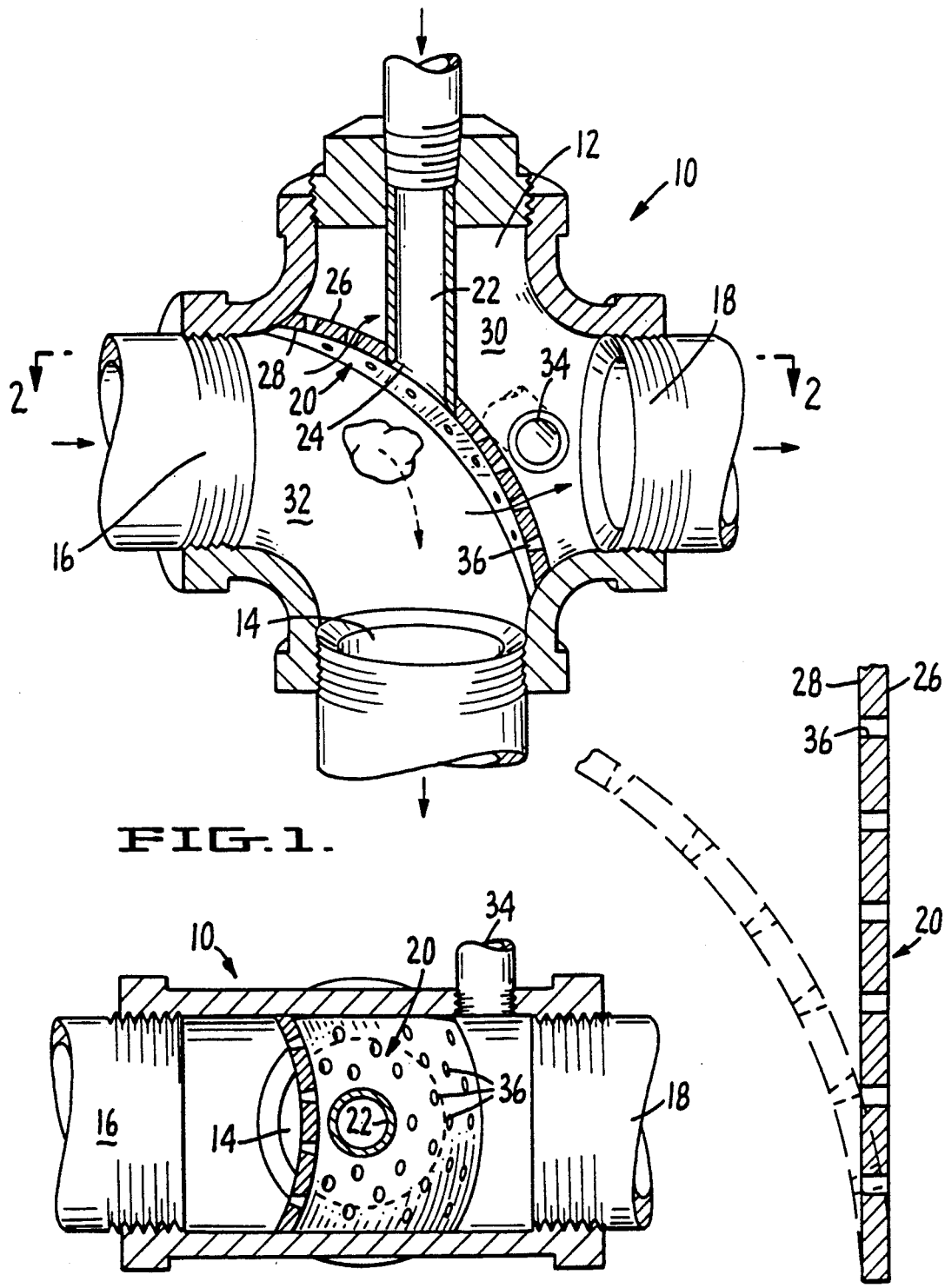

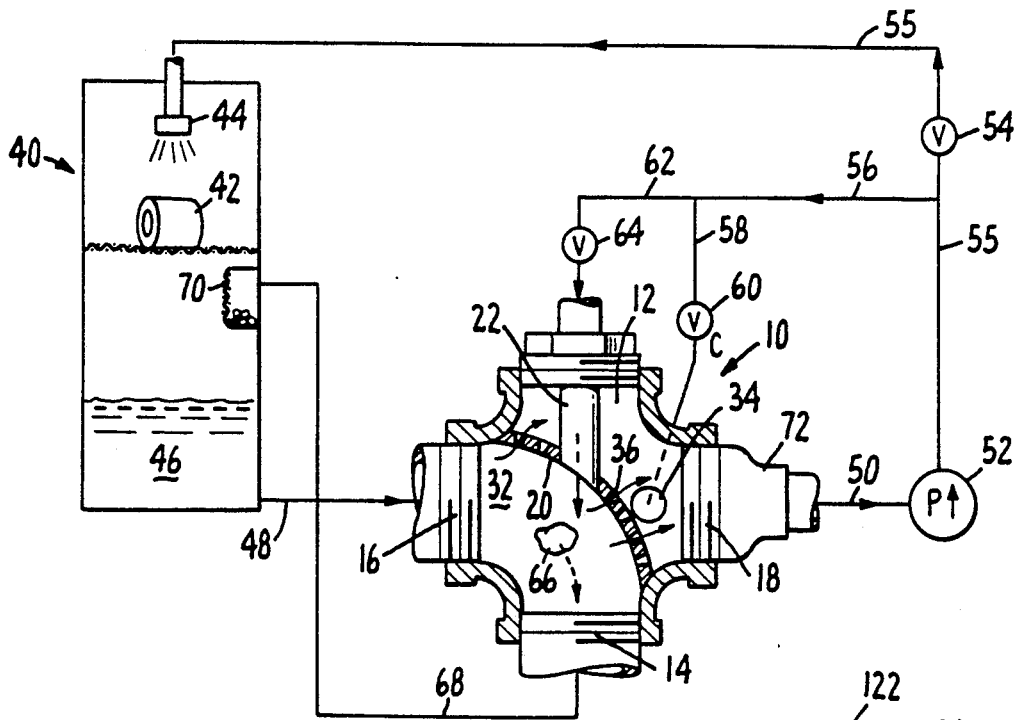
FIG. 4.
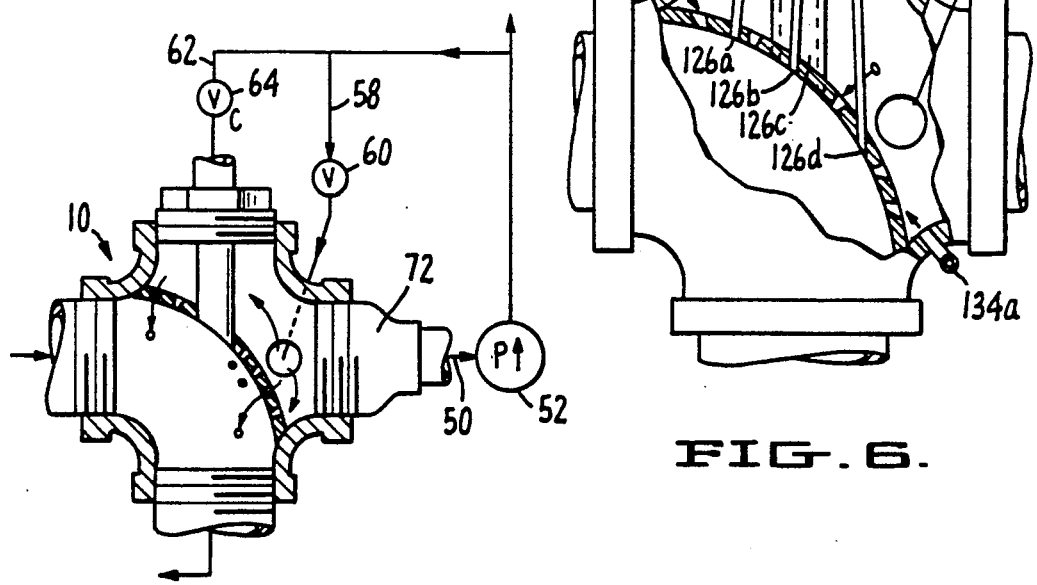
FIG. 5.
FIG. 6.

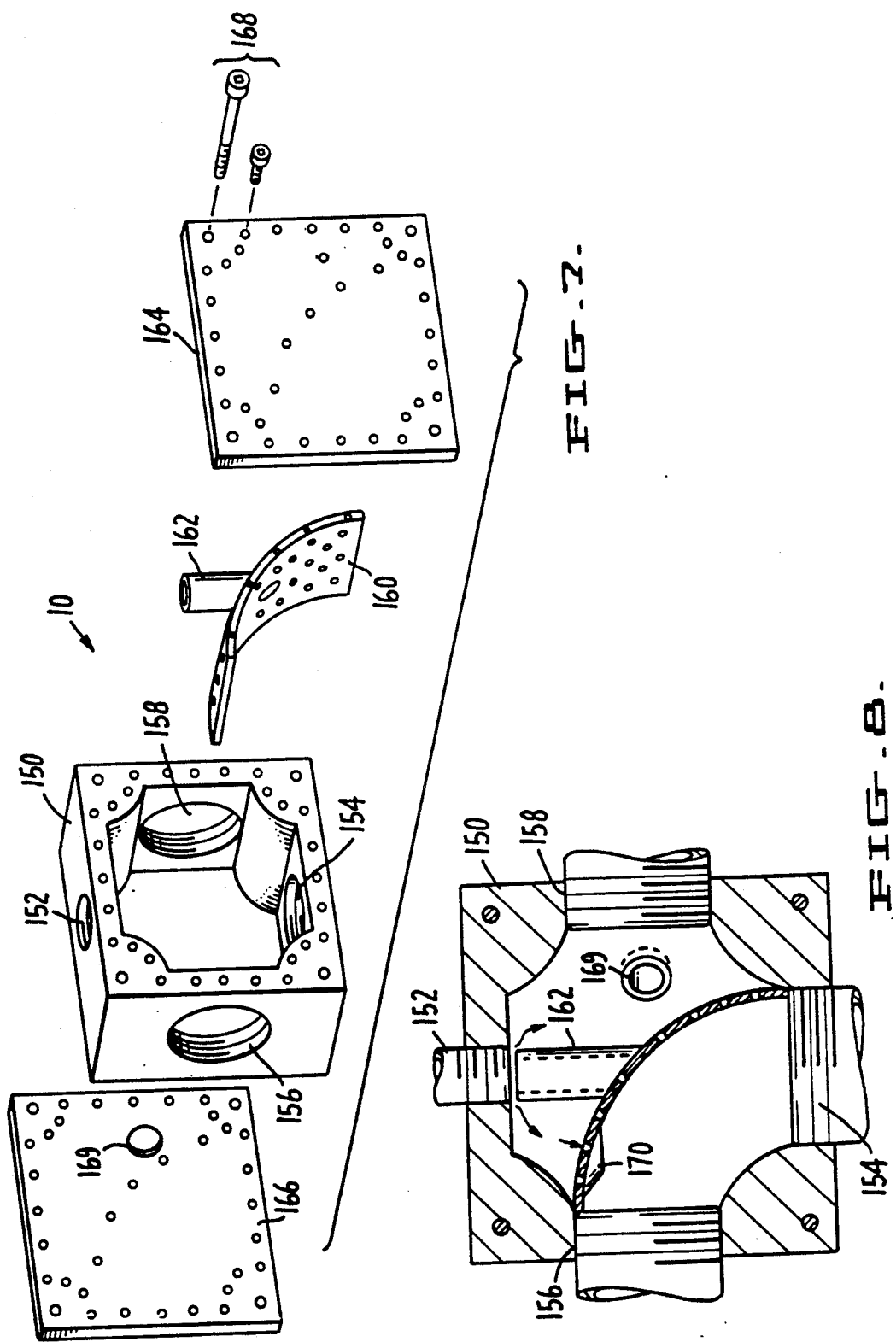

APPARATUS FOR DIVERTING FLUID-ENTRAINED SOLIDS AROUND A CENTRIFUGAL PUMP

RELATED APPLICATION DATA

This application is a continuation in part application of Application Ser. No. 07/406,821, filed Sept. 13, 1989, now abandoned, which is a file wrapper continuation application of application Ser. No. 07/174,876, filed Mar. 29, 1988, now abandoned, which is a continuation in part of application Ser. No. 07/045,365, filed May 1, 1987 and now U.S. Pat. No. 4,740,317.

TECHNICAL FIELD

This invention relates generally to fluid handling and fluid streams containing solids, and more particularly to apparatus and methods for simply removing the solids from the fluids, particularly on the intake side of an impeller driven centrifugal pump, or for simply moving the liquids containing solids without passing through a pump.

BACKGROUND OF THE INVENTION

Fluid handling is a vast field with applications in power generation, materials handling, the petrochemical industry, sewage, drinking water and many other fields too numerous to list. One vexing problem in almost all fluid handling applications involves pumping fluids which contain particles or solids. The most efficient type of pump for the displacement of fluids is the impeller driven centrifugal pump. The centrifugal pump is most efficient at converting the drive shaft motor power into useful work capable of displacing fluids. The centrifugal pump operates by the rotation of an impeller. The impeller is typically constructed of a malleable material capable of deforming under varying stress and capable of passing entrained particulate matter. One difficulty with impeller driven centrifugal pumps is that the impeller is easily torn to pieces by solid materials whose diameter approaches the impeller diameter. In industrial applications pump failure is routinely experienced at great cost in both production time and material costs, often requiring tedious decontaminations or isolations of hazardous materials. Other applications raise other safety concerns from pump failure.

The most direct approach to prevent pump failure due to the presence of solids in the impeller is to use a screen or filter to strain the particulate matter from the fluid intake side of the pump. This method suffers from a significant shortcoming since the accumulation of solids on the filter or screen creates a pressure drop resulting in the steady decay of pumping flow rates. Eventually the screen becomes so enmeshed with solids that fluid passes through so slowly as to starve the pump and result in another type of failure from burning the pump out. This approach to the problem therefore requires that the filter be periodically cleaned, at the expense of valuable production time, to insure adequate flow rates to the intake side of the pump. Parallel sets of filters are often installed to avoid downtime. This approach involves additional capital expense, particularly in industrial applications in refineries and power generation units.

Another approach has been to develop alternative pump designs which do not suffer from the impeller shearing problems described above. In many applications involving mining and dredging, piston type pumps have been developed to permit the transport of particle-rich fluids without damage to the pump hardware. These designs, while addressing the solid particle problems, are inefficient.

For the first time, the present invention provides an apparatus to remove solids from a fluid stream on the intake side of a centrifugal pump without solid buildup on the separating device and without the decaying pressure drop problems associated with classical filtration. The apparatus is constructed of standard pipe joint parts. It requires no active maintenance and is easy to install and operate. It is applicable to a wide range of applications from the chemical processing industry, to site construction excavations, municipal water supplies, to electrical power generation. The apparatus incorporates proven principles of pressure vessel design and requires no additional training to operate even in highly dangerous applications.

It is therefore an object of the present invention to provide an apparatus for the removal of solids from fluids on the intake side of a centrifugal pump.

It is a further object of the instant invention to provide a novel separating apparatus which is constructed of conventional pipe parts, or derived from conventional parts.

It is another object of this invention to provide solid/fluid separation without a gradual increase in the pressure drop across the separating medium.

It is a still further object of this invention to provide a novel separating apparatus which is easy to maintain and repair.

It is an object of this invention to provide an apparatus which permits the transfer of fluids, containing solids, by diverting the entrained solids around the pump.

It is a further object to provide an apparatus which can increase flow rate without the addition of incremental power.

These and further objects of the instant invention will become readily apparent to those of ordinary skill in the art by reference to the instant specification and figures.

SUMMARY OF THE INVENTION

The present invention provides an apparatus for separating solid matter from a fluid which comprises a pipe-cross chamber having a main upper outlet, a main lower outlet, a horizontal, main fluid intake and a horizontal, pump-side fluid outlet; a perforated deflector/separator plate sealingly and angularly disposed within said pipecross chamber such that said pipecross chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having at least one aperture therethrough for receiving at least one means defining a shear jet; at least one means defining an elongate shear jet, sealingly received within, and coaxially disposed along, said main upper outlet, one end of said shear jet defining means passing through said main upper outlet and communicating externally of said upper chamber region, and the other end of said jet defining means angularly fitted to, and received by, said deflector/separator upper surface such that said means defining a shear jet is sealingly received by said deflector/separator plate aperture; and, at least one backflush inlet through the walls of said pipecross upper chamber region for communication of fluid external of said upper chamber region towards said deflector/separator plate.

The instant invention also provides a method for removing particles and the like from fluids being fed to a centrifugal pump which comprises the steps of: providing an apparatus for separating solid matter from a fluid which comprises a pipecross chamber having a main upper outlet, a main lower outlet, a horizontal, main fluid intake and a horizontal, pump-side fluid outlet; a perforated deflector/separator plate sealingly and angularly disposed within said pipecross chamber such that said pipecross chamber is separated into an upper chamber region and a lower chamber region, the upper chamber region bounded by the upper surface of said plate, said main upper outlet and said horizontal, pump-side outlet, and the lower chamber region bounded by the lower surface of said plate, said main lower outlet and said horizontal, main fluid intake, said deflector/separator plate further having at least one aperture therethrough for receiving at least one means defining a shear jet; at least one means defining an elongate shear jet, sealingly received within, and coaxially disposed along, said main upper outlet, one end of said shear jet defining means passing through said main upper outlet and communicating externally of said upper chamber region, and the other jet end angularly fitted to, and received by, said deflector/separator upper surface such that said shear jet defining means is sealingly received by said deflector/separator plate aperture; and, at least one backflush inlet through the walls of said pipecross upper chamber region for communication of fluid external of said upper chamber region towards said deflector/separator plate; connecting a first fluid source to the horizontal, main fluid intake of the provided apparatus; connecting a centrifugal pump to the horizontal, pump-side fluid outlet of the provided apparatus; connecting a second fluid source to the provided apparatus means defining a shear jet, said second fluid source necessarily at a pressure greater than the fluid pressure extant in the pipecross chamber of the provided apparatus; connecting a third fluid source to the backflush inlet of the provided apparatus; and, providing means for transporting the separated matter away from the provided pipecross chamber main lower outlet.

The instant invention also provides an embodiment in which the deflector/separator plate is deleted, and the separation of solids is accomplished by the shear jet defining means.

In a still further embodiment, the main lower outlet of the provided pipecross chamber is connected to a pipe elbow means which is modified to include a second shear jet directed towards said pipe elbow means outlet. This additional embodiment is effective with or without the deflector/separation plate, and with or without said means defining a shear jet disposed in said pipecross chamber.

It is also disclosed that entrained solids can be diverted around the centrifugal pump by connecting said pipecross chamber main lower outlet to the centrifugal pump discharge line, at an acute angle to create a siphon effect, thereby reintroducing the separated solid particles to the fluid which has gone through the centrifugal pump.

BRIEF DESCRIPTION OF THE FIGURES

FIG. 1 is a front elevation partially broken away to show the pipecross chamber and deflector/separator plate of a preferred embodiment of the instant invention.

FIG. 2 is a cross sectional view taken along the line 2—2 in FIG. 1, showing the spatial relationship between means defining a shear jet, deflector plate and the pipecross chamber inlets and outlets.

FIG. 3 is a cross sectional detail of the deflector/separator plate of a preferred embodiment of the instant invention, the curvature of the plate resulting in a change in the perforation profile as shown by the broken lines.

FIG. 4 is a flow diagram of the instant invention showing a particular application of the instant invention.

FIG. 5 is a detailed view of the backflush inlet of a preferred embodiment of the instant invention.

FIG. 6 is a detailed view of an alternate embodiment of said shear jet defining means of the instant invention.

FIG. 7 is a perspective view of an alternate embodiment of the instant invention.

FIG. 8 is a partially broken away elevational view of an alternate embodiment of the instant invention.

DETAILED DESCRIPTION OF THE INVENTION

Figure 9:
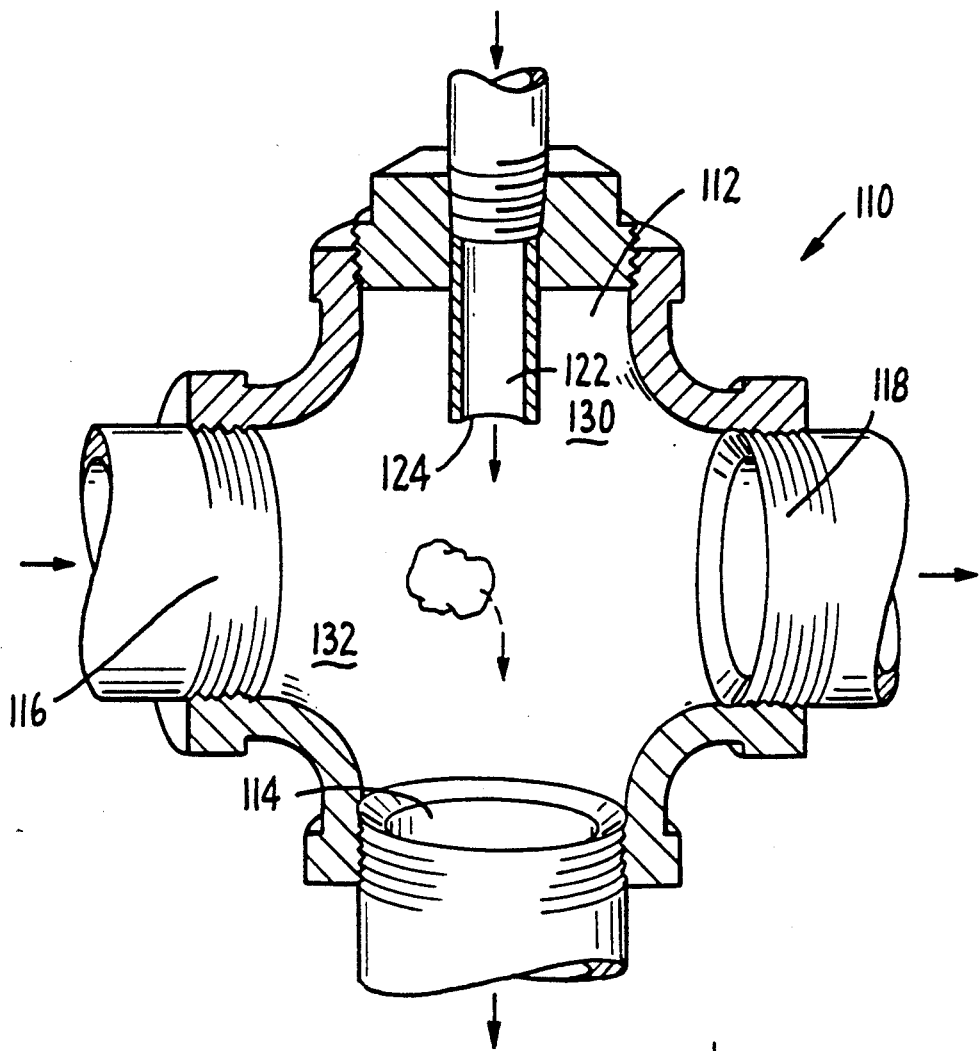
FIG. 9 is a front elevation partially broken away to show the pipecross chamber and means defining a shear jet in the alternate embodiment wherein no perforated deflector/separator plate has been provided.

The present invention was designed with reference to an automotive parts washing apparatus in which a water/caustic wash fluid is used to clean automotive parts. The parts are often grease covered, resulting in a two-phase liquid system, additionally containing metal shavings, nuts, bolts and miscellaneous solid objects. Separation of the gross solid matter is desirable since the washing fluid is recycled. While reference in the specification is made to the specific application to which this device has already been successfully applied and demonstrated, it will be apparent to those of ordinary skill in the art that the instant invention has a myriad of applications, far beyond the specific application discussed in the working example below.

FIG. 1 is a partially broken away view of the apparatus of the instant invention. A separator 10, in this embodiment is constructed out of an ordinary pipecross. The separator 10 has a main upper outlet 12, a main lower outlet 14, a horizontal, main fluid intake 16 and a horizontal, pump-side fluid outlet 18. The minimum number of main ports into the separator is four and separators having more ports than the four described here are intended to be within the scope of the invention and the appended claims. Disposed within the separator 10 is a deflector/separator plate 20. In the presently preferred embodiment, plate 20 is curved, but it is intended that a flat plate angularly disposed within the separator 10 is within the scope of the instant invention. A more complete discussion of the characteristics and requirements of the plate 20 appears below, specifically with reference to FIGS. 3 and 7.

A shear jet 22 is also disposed within the separator 10. In this embodiment, the shear jet 22 is coaxially disposed within the main upper outlet 12, communicating externally of the separator 10. It is intended that the inner diameter of the shear jet 22 is less than the inner diameter of the main ports (12, 14, 16 and 18). This reduced diameter insures that the velocity of the fluid entering from the jet is typically higher than the velocity of fluid entering the separator from the horizontal, main fluid intake 16. The desirability of the increased velocity will be come more apparent below. The shear jet 22 terminates at the deflector/separator plate 20, being received within a jet aperture 24 through the body of the plate 20. Thus the shear jet 22 effluent enters the separator 10 below a plate upper surface 26. As described more fully below, variations of this shear jet embodiment are possible, such as the use of a plurality of jets disposed angularly within the main upper outlet. Also it is possible to provide the shear jet 22 in two longitudinal sections whereby one such section is permanently welded to the plate jet aperture 24. The other section of the jet 22 would be permanently fixed within the upper outlet 12. The connection between the two sections of the jet 22 need not be completely sealed, as slight leakage would provide a showering of fluid upon the plate upper surface 26. Additional disclosure of the relationship between the jet 22 and plate 20 is provided below with reference to the alternate embodiment shown in FIG. 7.

Referring to FIG. 1, it can be seen that the deflector/separator plate 20 divides the separator 10 into two regions. An upper chamber region 30 is bounded by the plate upper surface 26, the main upper outlet 12 and the horizontal, pump-side fluid outlet 18. A lower chamber region 32 is bounded by the plate lower surface 28, the main lower outlet 14 and the horizontal, main fluid intake 16. It is necessary that the plate 20 be sealingly received within the separator 10 such that fluid communicates from the lower region 32 to the upper region 30 only through the deflector/separator plate 20. In the presently preferred embodiment, wherein the deflector/separator plate is constructed of metal, traditional welding techniques are used to affix the plate 20 to the separator 10 inner walls. The weld is also extended to insure that the plate 20 is sealed against the inner wall. It is intended however that alternate materials of construction are within the scope of this invention. For example, polyvinylchloride pipes are used in many diverse applications. It is possible to construct a separator 10 and plate 20 from polyvinylchloride. In that application, chemical adhesives, for example epoxies and silicon caulking, could be used to sealingly fix the deflector/separator plate 20 within the separator 10.

A backflush inlet 34 is provided to communicate externally from the upper chamber region 30. Although described more fully below with reference to FIGS. 4 and 5, suffice it to say that the backflush inlet 34 is useful to forcibly eject any type of solid material which may accumulate on, in or near the plate perforations 36. A special valving arrangement and mode of operation are described below for the use of this backflush inlet 34. It is also noted that a plurality of backflush inlets may be provided in which multiple fluid jets are directed toward and impinged upon the plate perforations 36. Such multiple inlets could be ganged together by attachment to a manifold capable of distributing fluid to a series of inlets. The particular use environment will determine the need and desirability of a plurality of backflush inlets, such knowledge being within the ordinary skill of an artisan in this field.

FIG. 2 shows a cross sectional view taken along the line 2—2 in FIG. 1. This view is intended to show the spatial relationship, in the preferred embodiment, of the main lower outlet 14, the shear jet 22 and the deflector/separator plate 20. In this particularly preferred embodiment, the shear jet 22 is concentric with the main lower outlet 14. In the embodiment wherein a plurality of shear jets is provided (see FIG. 6), it is intended that the jets all be disposed directly above the main lower outlet 14 to prevent the creation of any additional turbulence or backflow from the reflection of the fluid jet against the lower chamber region 32 wall.

It is also contemplated at this time that the use of a plurality of shear jets (as shown for example in FIG. 6) could potentially eliminate the need for the deflector plate at all, or could result in a greatly modified design of the plate. Additional research work is presently ongoing to test this principle and more completely define and characterize the crucial parameters. It is believed at this time that the shear caused by the higher velocity fluid entering the chamber interacts with the fluid and contained particles to drive the particles downwardly towards the main lower outlet 14.

The fabrication of the deflector/separator plate 20 is shown in detail in FIG. 3. The below described method relates only to curved and metal plates. As noted above, a flat plate and PVC materials of construction are intended to be within the scope of this invention. The important characteristic resulting from this particular method of fabrication is that the perforations 36 through the plate 20 have a varied "pore diameter." As shown in broken lines in FIG. 3, the perforations in the lower surface of the plate 28 have a smaller diameter than the perforations on the upper plate surface 26. This perforation characteristic prevents solid particles from stubbornly lodging within the perforations since anything which passes through the smaller pore diameter must necessarily pass through the larger pore diameter extant on the plate upper surface 26. In the presently preferred embodiment, a flat plate 20 is perforated by known techniques, e.g. punching or drilling, and then the plate is rolled to add the curvature shown in the figure. This rolling step causes the plate to be elongated on the upper plate surface while compressing the lower plate surface. This force variation results in the pore diameter variation shown by the broken lines in FIG. 3.

A particularly preferred method of use of the separator apparatus is now described with reference
  i to FIG. 4. In this application the preferred apparatus described above is shown in FIG. 4, but it will be apparent that other apparatus can be provided which are within the scope of the instant invention. An automatic automobile parts washer 40 is used to decrease and cleanse automobile parts 42. A liquid sprayer 44 is disposed within the washer 40 to inject a caustic soda wash onto the part 42. Wash fluid liquid 46 accumulates in the bottom of the washing apparatus 40. In this embodiment, a wash fluid recycle line 48 is provided to recycle the wash fluid to the sprayer 44. The wash fluid 46 which accumulates in the washer 40 contains particles and other solid materials, as well as emulsified oil and greases. In order to recycle the fluid from the bottom of the washer 40 to the sprayer 44, the fluid must pass through the recycle line 48 towards the pump intake 50 and pump 52.

As noted above one of the more vexing problems related to systems of this type is that solid particles entrained with the fluids are fed to the pump and thereby damaging to the pump impeller, often tearing the impeller and resultantly losing the seal required to effect the fluid transfer. To prevent the passage of solids from the washer bottom to the pump 52, the separator 10 is installed in the wash fluid recycle line 48 to separate the solids from the pump intake 50 to thereby prevent damage to the impeller in pump 52. The pump effluent is then directed back towards the sprayer 44. An isolation valve 54 is provided in the sprayer feed line 55 to close off the washer 40 from the pump 52 when required. A bleed line 56 is tapped off of the pump effluent/sprayer feed line 55 and connected to a backflush inlet line 58 which contains a backflush valve 60. The bleed line 56 is also connected to a shear jet line 62 and shear jet valve 64 before passing into the shear jet 22.

The result of this flow scheme is that solid particles 66 are directed toward, separated from and deflected away by the deflector/separator plate 20. The solid particles are maintained within the lower chamber region and pass out of the separator 10 through the main lower outlet 14. A return line 68 is connected to the main fluid outlet 14 to return wash fluid to the washer 40 through the screen box 70. The "filtered" wash fluid then passes into the upper chamber region 30, into the horizontal, pump-side fluid outlet 18 and through a reducer 72.

The configuration shown in FIG. 4 represents the steady state run mode of the instant method and apparatus. Note that the backflush valve 60 has the letter "C" alongside. This notation indicates that during the steady state operation of this apparatus, the backflush valve 60 is closed. Shear jet valve 64 however is open during this time to permit fluid at a higher pressure than on the intake side of the pump to pass into the separator 10 through the shear jet 22.

With reference to FIG. 5, the "backflushing" mode is shown in partial detail. In FIG. 5, the backflush valve 60 is open and the shear jet valve 62 is designated as closed. In this configuration the bleed line 56 is open to the pump effluent, causing the injection of higher pressure fluid toward and impinging upon the plate upper surface 26. This action permits the dislodgement of any entrapped particles or solids which may have become lodged in the plate perforations 36. A quick backflushing can be accomplished without long periods of shutdown in the pump operation. It is also recognized that the flow of fluid into the backflush inlet 34 can provide an additional flow of fluid towards pump 52 if the deflector/separator plate 20 becomes clogged with solids. This can prevent pump starvation, cavitation and failure.

FIG. 6 shows an alternative embodiment of the separator apparatus. Two variations from the particularly preferred embodiment merit attention. The first relates to the shear jet 122. In the preferred embodiment described with reference to FIG. 1, there was only a single shear jet. In this embodiment a single shear jet feed 122 is provided. Branching off from this single feed is a manifold 124 which feeds a plurality of shear jets 126a, 126b, 126c and 126d. As in the case of a single shear jet, the ends are sealingly fixed within apertures in the deflector/separator plate.

FIG. 6 also shows a variation on the backflush inlet described above with reference to FIG. 1. In particular, a plurality of backflush inlets 134a, 134b and 134c are provided. Each of these backflush inlets is connected to a manifold in turn connected to a backflush inlet line tapped into the pump bleed line. These multiple backwash jets permit more vigorous and localized backflushing to dislodge particles from the plate perforations.

FIG. 7 describes a separator 10 having a pipecross-like chamber 150 in which the sidewalls are removable. The above-described preferred embodiment utilized existing hardware. This embodiment represents a novel design specifically developed for this application. As with the conventional pipecross, this embodiment uses four major ports, a main upper outlet 152, a main lower outlet 154, a horizontal, main fluid intake 156 and a horizontal, pump-side intake 158. In this embodiment a removable deflector/separator plate 160 is provided for ease of installation and maintenance. It is also possible to provide a customer with series of plates having perforations of varied size and selected to fit the particular application required. A longitudinal sectional shear jet 162 comes preaffixed to the deflector/separator plate. The length of the longitudinal section is chosen to allow insertion and removal of the plate through the sidewall openings. Front plate 164 and rear plate 166 are shown in exploded view. They are to be bolted to the main pipecross-like chamber using bolts 168. Clearly the amount and strength of the bolts is dependent upon the operating pressure of the system to which it is applied. Rear plate 166 also has an orifice 169 which is used to act as a backflush inlet.

FIG. 8 shows a cross sectional view of the instant invention wherein two longitudinal sections are combined to form the shear jet 162. In this embodiment there is a slight gap between the lower section 162 and the upper section within the main upper outlet 152. This gap as shown in the figure permits fluid to leak out of the shear jet and disperse jets of fluid against the deflector/separator plate upper surface.

FIG. 8 also shows a baffle 170 attached to the lower surface of the plate. The baffle allows the deflection of large particles directly toward the lower fluid outlet. This baffle 170 is preferably located in between the fluid intake and the shear jet. The baffle is useful in the particularly preferred embodiment of FIG. 1 and can be attached to the plate by conventional welding techniques.

An alternate embodiment of the present invention is described with reference to FIG. 9. In this embodiment, there is no deflector/separator plate. Instead, the solid particles are separated from the fluid entering the separator 110 through the horizontal main fluid intake 116 by perpendicular force applied from means defining an elongate shear jet 122. It has been found that efficient removal of solid particles can be obtained by the use of means defining a shear jet 122, without the deflector/separator plate. The turbulence created at the shear jet open end 124 causes the entrained solid particles to be deflected toward the main lower outlet 116. The fluid exiting the separator 110 at the horizontal pump-side fluid outlet 118 is substantially free of large solid particles.

It is also contemplated that several shear jets can be disposed within the main upper outlet 112. A similar configuration is described with reference to FIG. 6 above, the difference being the presence of the deflector/separator plate in the embodiment described with reference to FIG. 6.

Referring to FIG. 4, it is shown that separated and diverted solids present in return line 68 are retained and accumulated in screen box 70, the filtered fluid falling into the bottom of washer 40, and thereafter returning to the separator apparatus through recycle line 48. Less elaborate, but important variations of this configuration are possible. For example, if it is desired to recover the solids or the liquids, or both, from return line 68 it would be possible to do so by a relatively simple technique. A catch basin could be provided below the main fluid outlet 14 in which the diverted solids and liquid would accumulate. If it is desired to recover or recycle the liquids, then an outlet can be provided at the bottom of the catch basin for removing the liquid.

According to the present invention, it is recognized that if the main fluid outlet 14 is connected to the catch basin at a point below the fluid level in the catch basin, there is provided extra protection against pump starvation, cavitation and subsequent failure. If, for some reason, there is a clog or reduction in flow towards pump 52 from the horizontal, main fluid intake 16, then flow inside the separation 10 can change, provided the connection between the main fluid outlet 14 and the liquid catch basin is below the fluid level in the catch basin. Liquid will flow from the liquid catch basin into the separator 10 through the main fluid outlet 14 and on towards the pump 52. The fluid returning through the main fluid inlet can be filtered if the separator/deflector plate is present.

Figure 10:
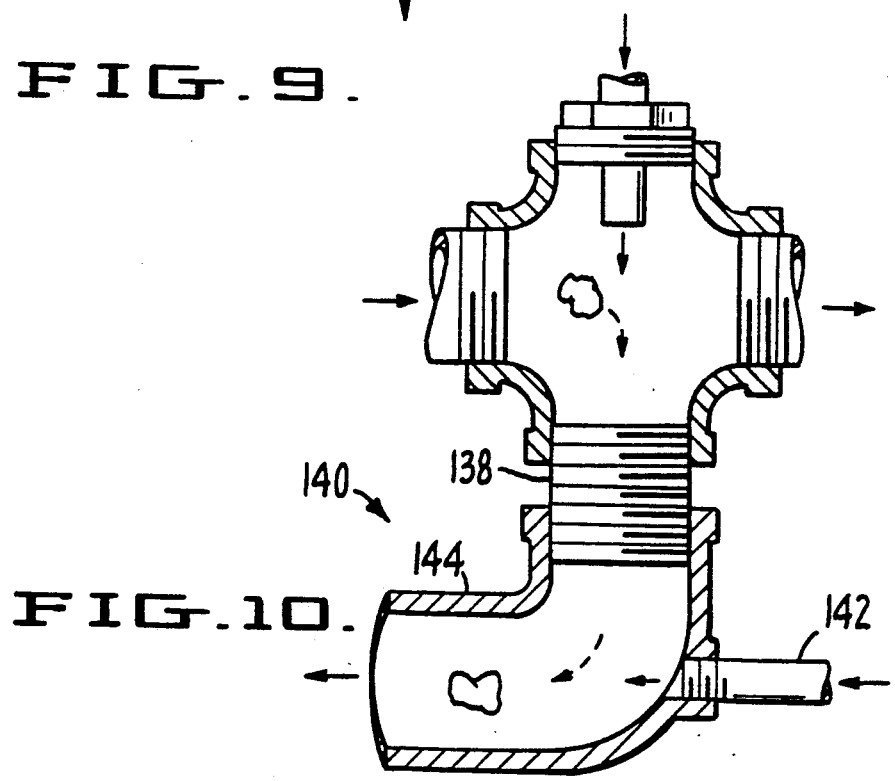
FIG. 10 is a front elevation partially broken away illustrating the addition of the pipe elbow to the apparatus shown in FIG. 9.

A further enhancement to the separator apparatus 10 is shown in FIG. 10. In this embodiment, pipe elbow means 140 is connected to the main lower outlet 114 through conduit 138. Pipe elbow 140 has an inlet side, closest main lower outlet 114, and an outlet side distal from separator 110. At the bend 144 in the pipe elbow 140, there is at least one means defining a second shear jet 142. This second shear jet defining means 142 is directed toward the pipe elbow outlet side. The second shear jet defining means can be a single jet, or there can be multiple jets depending upon the particular application. The use of this second jet in the pipe elbow creates additional downward force to separate the solid particles from the liquid flowing across the separator 110.

It is possible to use the pipe elbow 140 in combination with the separator apparatus 10 described in FIG. 1.

Further, it is possible to use the pipe elbow 140 with a separator apparatus in which there is no external shear jet disposed within the main upper outlet of the separator 110.

It is conceived to assemble a series of pipe elbows 140, each having a shear jet defining means at the elbow, each adding force in the direction of flow through the pipe elbow. It is also intended to include within the scope of this invention a combination of pipe elbows and in line jetting such as described with respect to the device shown in FIG. 12. The shear jet defining means can be connected to a pump bleed line, such as described with reference to shear jet line 162 in FIG. 4, or to some other source of fluid at a higher pressure than existing in the pipe elbow 140.

Figure 11:
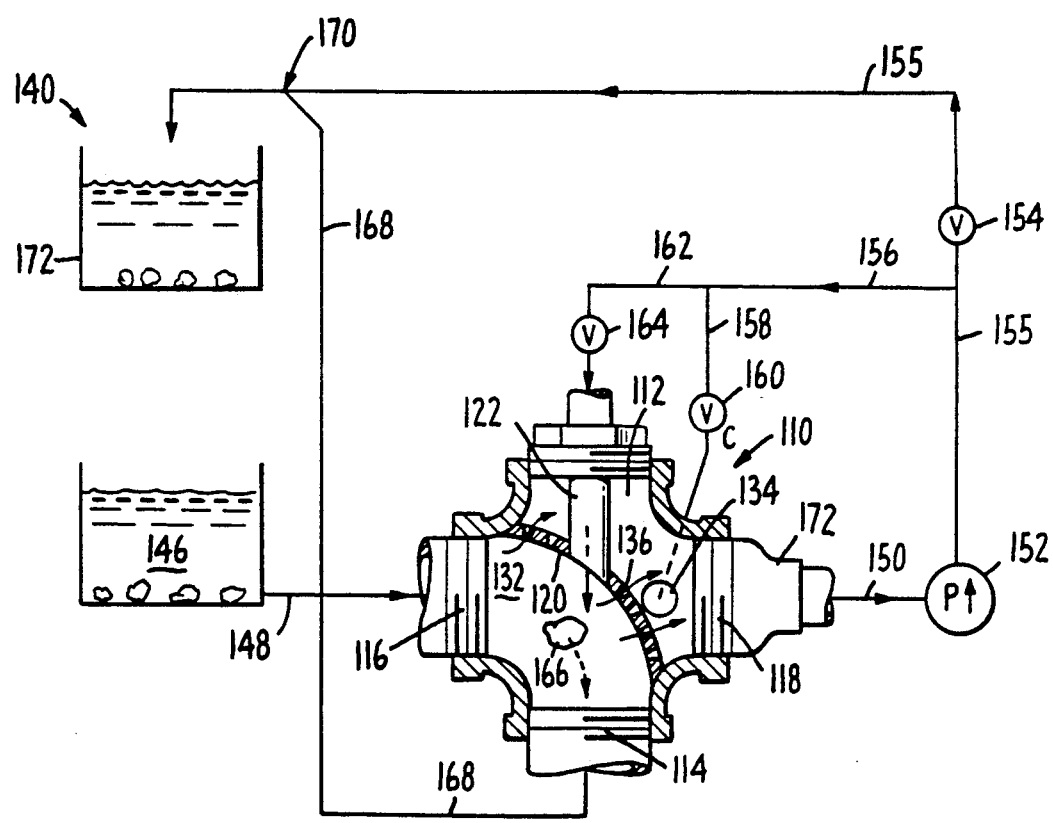
FIG. 11 is a flow diagram of the instant invention in which the entrained solids are diverted around the centrifugal pump, and subsequently reintroduced to the fluid which has passed through the pump.

Referring now to FIG. 11, an apparatus is provided whereby solid particles entrained in fluid can be diverted around a centrifugal pump and subsequently remixed to provide a single fluid stream containing solids. While this figure and subsequent description refer to an embodiment in which the separator 110 contains the perforated deflector/separator plate 120, it is intended that this invention can be practiced using the separator 110 shown in FIG. 9, in which the deflector/separator plate has been deleted. According to this aspect of the invention, there is provided a first fluid source 146 in which is contained a fluid having solid particles 166. This first fluid source 140 can be a construction excavation site, a mining operation, or any situation in which it is desired to transport a fluid containing particles to a higher point. Typically, a pump is used to accomplish this goal. However, as more fully described above, it is generally difficult to use a centrifugal pump to transfer fluids containing solids whose particle size approaches that of the pump impeller diameter. This situation results in impeller failure, and costly replacement. Other types of pumps, less prone to interruption from suspended solid particles, are less efficient in moving the fluid. It is intended by this aspect of the present invention to use a centrifugal pump to transfer the fluid contained within the first fluid source 146, but to use the separator 110 to divert the entrained solid particles around the centrifugal pump 152, and to subsequently reintroduce the solid stream to the pumped fluid, downstream of the centrifugal pump thereby eliminating impeller failure due to the presence of solids inside the pump cavity.

The first fluid source is connected to the separator 110 through at first fluid outlet 148. The first fluid outlet 148 is connected to the separator 110 through the horizontal main fluid intake 116. Solid particles 166, entrained within the fluid, are directed downward towards the main lower outlet 114, and are carried away from the separator 110, through a return line 168. The fluid which has been separated from the deflected solid particles 166 passes through the deflector/separator plate 120 and exits the separator 110 through the horizontal, pump-side fluid outlet 118, through reducer 172 and into a pump intake line 150. This line 150 is in turn connected through centrifugal pump 152, exhausting into a pump exhaust line 155. Pump bleed line 156 and shear jet line 162 are respectively connected to the backflush inlet 134 and means defining a shear jet 122.

To enable the transport of the solids through return line 168, without introducing a pump to accomplish the necessary work to elevate the fluid to a higher location, the return line 168 is attached to the pump exhaust line 155. The connection between these two lines is made to create a siphon effect. The fluid flowing through the pump exhaust line 155 is at a higher pressure than the fluid flowing in the return line 168. The return line 168 is connected to the pump exhaust line 155 at an acute angle 170. This configuration emphasizes the pressure differential between the two lines, and creates a siphon effect in the return line 168. Thus, the solids 166 are diverted around pump 152 and are thereafter transported to tank 172 without passing through, or damaging, the pump impeller.

It has also been recognized that the use of means defining a shear jet 122 creates an increase in the fluid flow volumes typically seen in systems of this type. The volume of fluid leaving the main lower outlet 114, when a shear jet 122 is used, is significantly greater than the simple addition of the pre-jet flow rate plus the shear jet flow rate. Instead, the rate of flow leaving through the main lower outlet 114 can increase greatly over that observed when no shear jet is used.

Figure 12:
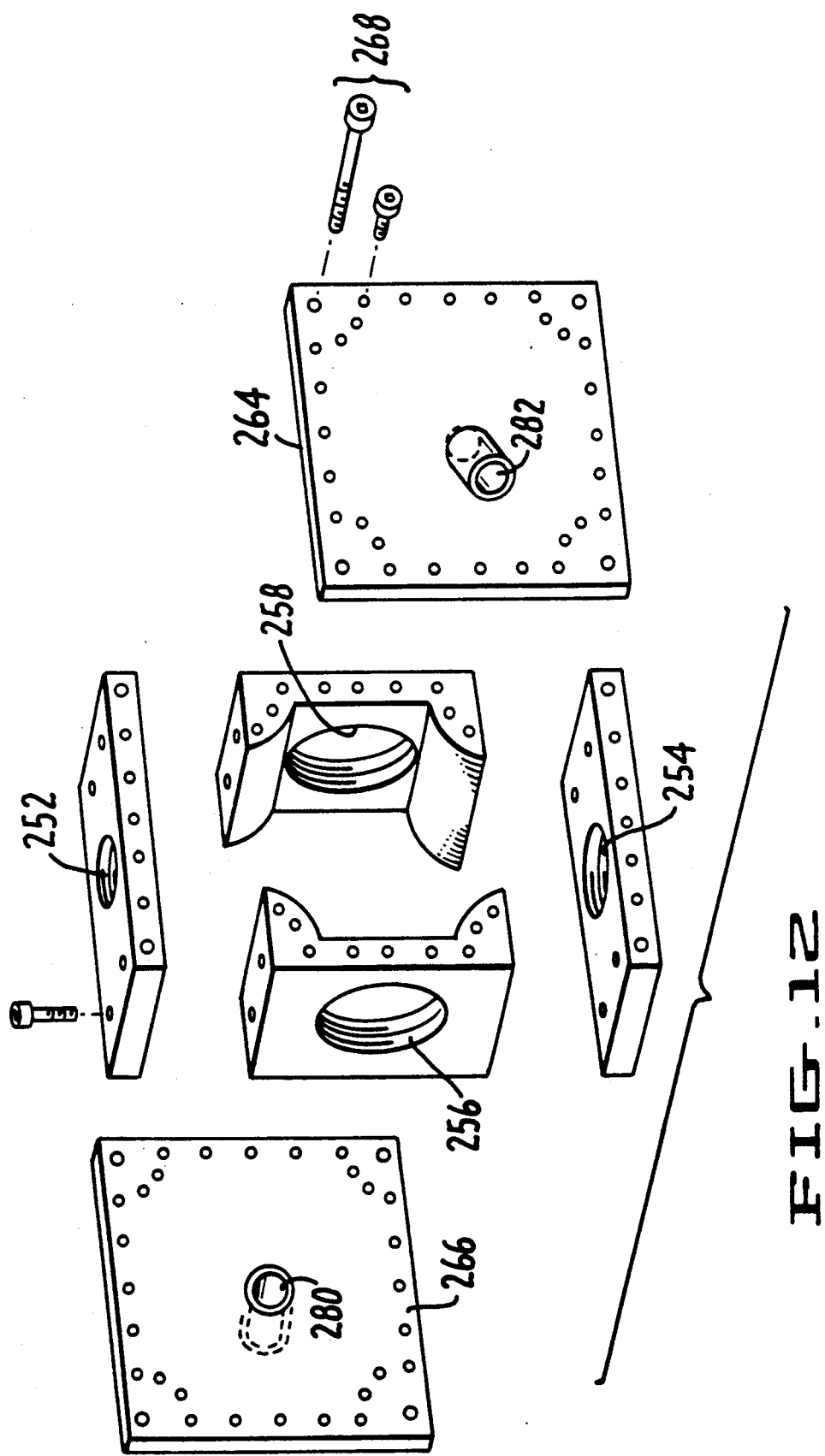
FIG. 12 is an exploded perspective view of an in line jet apparatus according to the instant invention.

A further aspect of the present invention is described with reference to FIG. 12. Although the apparatus described is similar in many respects to the device shown in FIG. 7, the device shown in FIG. 12 is quite different and intended to function downstream of the device proposed in FIG. 7. In the device shown in FIG. 12, hereinafter referred to as an in line jet apparatus, there is no deflector/separator plate and shear jet, identified as 160 and 162, respectively, in FIG. 7. The in line jet apparatus also permits the removal of all six sides, vastly increasing its flexibility and convenience to use. Fastening means 268 are self-explanatory, the choice and implementation of specific means representing a function of the particular apparatus, and its choice clearly within the skill of the ordinary artisan.

This in line jet apparatus does not provide a shear jet defining means perpendicular to the main fluid flow from inlet port 256 to outlet port 258. Instead, the in line jet apparatus provides shear jet means parallel to the main fluid flow across the device. A common characteristic however, is that the fluid entering through jets 280 and 282 must be at a pressure higher than extant inside the chamber. This additional pressure can be obtained from external sources, or it can be economically and conveniently provided by a pump bleed line as described in FIGS. 4 and 11.

The device described in FIG. 12 is intended to work by itself, or in combination with the pipecross chamber shear jet device and/or the pipe elbow described in FIG. 10. The configuration of this device is best described with reference to FIG. 4. The in line jet apparatus could be inserted in return line 68, or in return line 168 in FIG. 11. In either case, the shear jets 280 and 282 would be directed parallel to the main fluid flow in the return line 68 or 168. Solids would thus be separated from the fluid stream headed toward the centrifugal pump intake. As was noted above, it is possible to combine the pipe elbow of FIG. 10 with the in line jet apparatus. It is within the skill of the ordinary artisan to select the most appropriate configuration and flow rate, depending upon the desired use.

Removable plates 252, 254, 256, 258, 264 and 266 permit simple and independent changes in the inlet/outlet dimensions and shear jet capacity without the need to change the entire in line jet apparatus.

An alternate embodiment of the present invention is further described with reference to FIGS. 13 and 14 which depict a system for transferring a liquid containing entrained solids from one tank to another without having to pass it through the impellers of a pump. Thus, pump damage and downtime due to such damage can be avoided while nevertheless transferring solids containing liquids.

Figure 13:
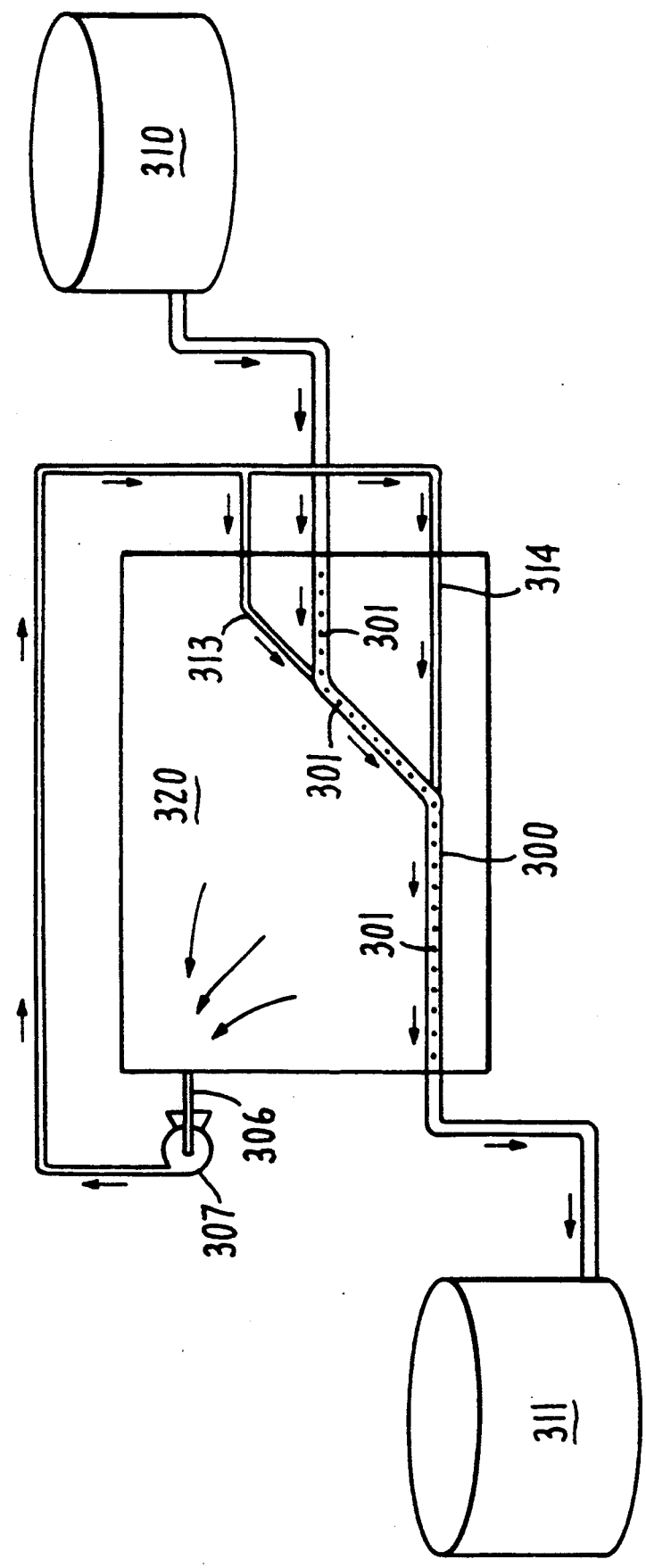

The overall view of FIG. 13 will orient the reader. A liquid containing solids is to be transferred from a storage tank 310 to tank 311 via transfer tank 320. The system of the invention in its broadest embodiment comprises the arrangement of pipes 300, 313, 314 within tank 320. Perforate pipe 300 carries the stream of liquids containing solids through tank 320, while allowing liquid to pass from within pipe 300 into tank 320 through perforations 301.

Naturally, perforations 301 must be sufficiently small to avoid the passage of solids from within pipe 300. In order to increase the traveling rate of solid particles through pipe 300 jet inlets 313 and 314 are used. These inlets are supplied with non-solids containing liquid derived from tank 320.

Figure 14:
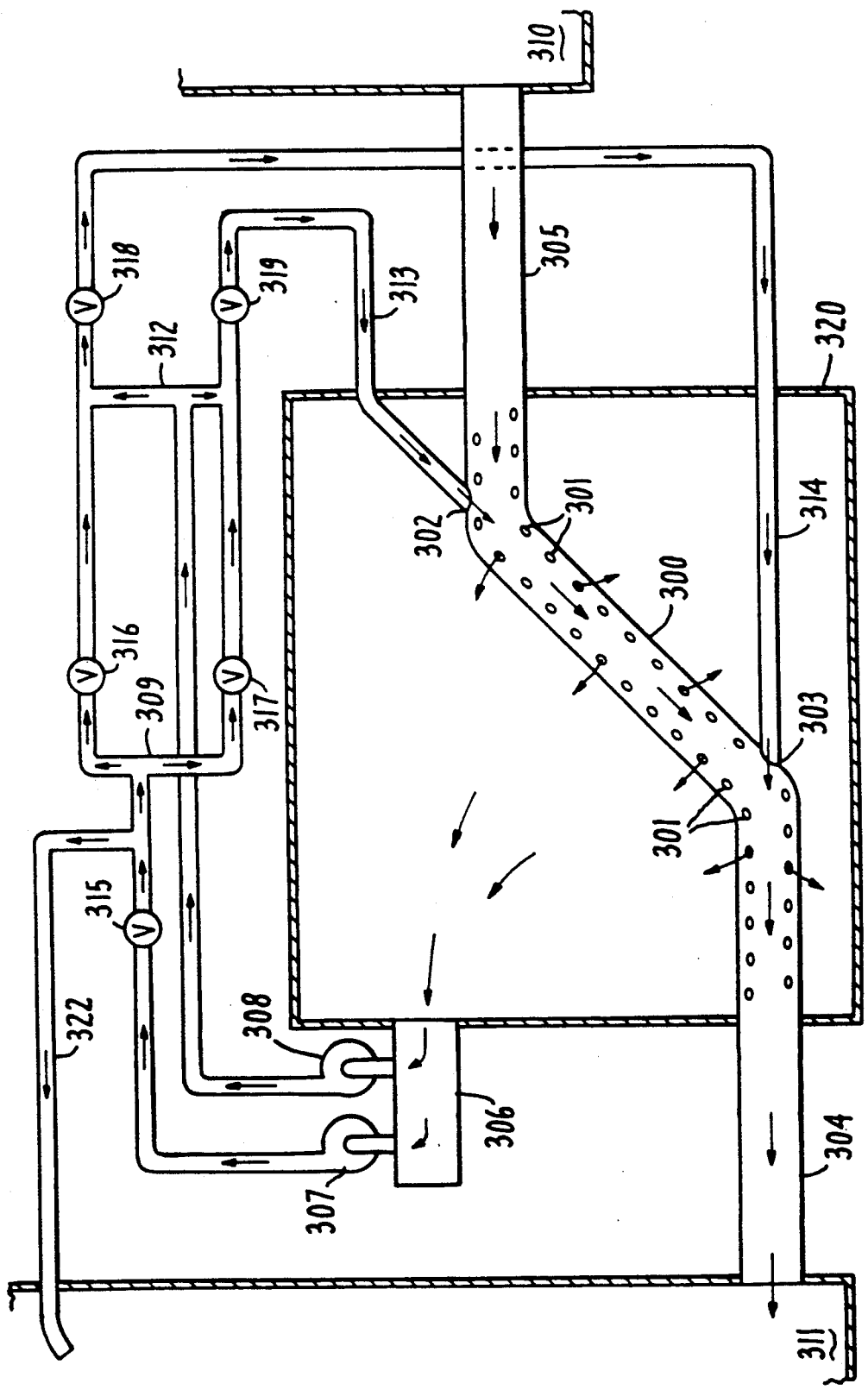

FIG. 14 shows the pipe arrangement within tank 320 in greater detail. The filtration device of the invention comprises a main pipe 300 having two bends and numerous holes or perforations through the wall of pipe 300 throughout the entire length of the pipe. One end of the pipe 300 is a suction line 305 and the opposite end is a pressure line 304. Two pressure jets 313 and 314 are attached to pipe 300 at the two bends. "Short" jet 313 is nearest the (inlet) primary suction line 305 and attaches at the bend nearest primary suction line 305, while "long" jet 314 attaches to pipe bend furthest from the suction line 305.

Jets 313 and 314 receive their pressure force from two pumps 307 and 308 which pump liquid from a secondary suction line on the opposite side of the box from the suction side of the main pipe. A network of valves (315, 316, 317, 318, 319) and flow lines 312 from manifolds and control the flow of fluid to the jets 313 and 314. Arrows in the lines, serve to indicate which way the fluid flows throughout the system.

The pumps 307, 308 feed themselves, by sucking fluid out of the transfer tank 320. Holes 301 in the filtration tube 300 allow the transfer tank 320 to fill. A main pump 307 provides the initial feed for the two pressure jets 313, 314 and a secondary pump 308 serves as a booster pump to increase the pressure and speed of fluid through the pressure jets 313, 314. The first pressure jet 313 nearest the primary suction line 305, causes the most dramatic increase in flow through the main pipe 300, as evidenced by a higher fluid level in the tank 311.

In operation, with both pressure jets 313, 314 turned on, the device sucks fluid from the primary suction line 305, attached to the filtration pipe 300. Because suction at end 305 occurs only when the jets 313, 314 are turned on, the jets are the primary force behind this sucking action. Additional suction of fluid out of the main pipe 300 occurs from the pump 307, 308 drawing fluid into the secondary suction line 306, through the numerous holes in the filtration pipe. However, suction through the main pipe holes 301 does not appear to contribute to the overall pressure in the pressure line, which is shown as lack of movement in the main pipe 300 when the pump 307 is running, and the "normal use" line 322 is open, i.e., no jets are running.

External suction of fluid occurring from within the main pipe holes 301 to fill transfer tank 320 serves the primary purpose of feeding the pumps 307, 308. However, the combined pressure from the jets 313, 314, and the outgoing water from the holes, may result in a synergistic effect which aids suction at the primary suction line end 305 of the filtration pipe 300. Here, suction is occurring from the suction end of the filtration pipe 300 as a result of pressure introduced from the pressure jets, and perhaps due to synergistic effects from outgoing water through the holes in the filtration pipe 300, being drawn into the pumps 307, 308. The result is a net suction as seen by the larger amount of fluid being sucked out of the tank 310 on the suction side (lower tank level) of the main pipe. Hence, while the pressure jets are obviously introducing pressure into the main pipe, a net suction is occurring. Despite this net suction, pressure still results in flow of liquid through the main pipe as seen by the flow of fluid (or fish) against the pressurized end 304 of the main pipe.

This embodiment of the present invention, therefore, relates to a main pipe 300 indirectly connected to a pump 307 (and 308) via two pressure jets 313 and 314, where the jets create the driving force for a net suction which occurs. Some water is being drawn back to the jet pump intakes through the holes in the main pipe, and the water in the main pipe which is not drawn through the holes exits under pressure from the pressure end. Therefore, at one end of the main pipe, a true suction exists. At the opposite end a true pressure exists without the aid of a pump directly in-line. Hence a pressure line results from what was initially a suction line without a pump, thereby illustrating that a "pressure line can be taken from a suction line", contrary to common teachings.

It will be apparent to those of ordinary skill in the art that it is necessary to protect pumps 307 and 308 from any solid matter. Presumably, the selection of the perforations in the filtration pipe 300 will avoid the transfer of solids from within pipe 300 to the transfer tank 320. It is nevertheless important to protect these pumps from solid matter which could irreversibly damage their impellers.

Having described the invention with respect to preferred embodiments, it is apparent that there are other embodiments and examples which are within the scope of the appended claims. For example, it is possible to hook together a series of these devices having plate perforations of diminishing size. This could enable ultrafiltration without pressure drop problems. It is also suggested that the perforation diameter be selected in light of the impeller diameter. It is a safe working assumption that particles whose size permits them to pass through the impeller will not damage the impeller. Therefore, one criteria for selecting pore diameter should include the pump impeller diameter.

It is also noteworthy that while the instant invention has been described with reference to being a pump filtration device it can be used without a pump.

With respect to the shear jet and the backflush inlet, while the preferred embodiment has been described with reference to using a pump bleed line, it will be apparent to ordinary artisans that other sources may be used for these fluid inlets. For example, it is possible to use the instant apparatus as a mixing chamber by utilizing the shear jet to introduce a second fluid. The backflush inlet may also be connected to a separate fluid source, not the pump bleed nor the shear jet fluid source.

EXAMPLE

In an apparatus similar to the one described in FIG. 4, a 3 HP, 3 phase Ingersoll-Rand pump was installed. The pump is characterized by high volume low pressure operation. It is estimated that the pump has a 150 gpm capacity. The pump inlet is 1¾ inches with an outlet of ¾ inch. A standard off the shelf 1½ inch pipecross was used to fabricate the separator according to the procedures described above. A ½ inch standard pipe nipple was used for the shear jet. After one hundred sixty-eight hours of continuous run time attached to the automobile parts washer there has been no degeneration in the measured flow rate and no pump damage despite the presence of solids.

In selecting the size of the separator chamber, it is suggested that the pipecross-like chamber be of a larger diameter than the intake line. This extra volume acts as a reservoir slowing the fluid velocity and making the separation of the solids easier. It is also useful to neck down the outlet side of the separator as it feeds the pump. This insures that the pump will not be starved when, for example, the shear jet is valved off and the backflush is momentarily turned on. It is also suggested that the separator be installed at a distance upstream of the pump. This volume also acts as a reservoir of fluid so that momentary flow changes will not adversely affect pump performance.

The deflector plate should also be designed to be of sufficient strength since the solids entrained in the liquids could impart significant momentum to the plate upon impact. Solid particle size and fluid velocity must be accounted for in choosing a plate thickness.

I claim:

1. An apparatus for diverting fluid-entrained solids around a pump which comprises:
   a) a pipecross chamber having a main upper outlet, a main lower outlet, a horizontal, main fluid intake, and a horizontal, pump-side fluid outlet;
   b) at least one means defining an elongate first shear jet, sealingly received within, and coaxially disposed along, said pipecross chamber main upper outlet, one end of said first shear jet defining means passing through said main upper outlet and communicating externally of said pipecross chamber and the other end of said first jet defining means exhausting into said pipecross chamber to create vertical flow within said pipecross chamber towards said main lower outlet;
   c) a first fluid source connected to said pipecross chamber horizontal, main fluid intake;
   d) a centrifugal pump, having an intake side and a discharge side, said pipecross chamber horizontal, pump-side fluid outlet connected to said centrifugal pump intake side;
   e) an elongate pump exhaust line, connected to the discharge side of said centrifugal pump;
   f) a pump bleed line, connected at one end to said pump exhaust line, and connected at its other end to said means defining an elongate shear jet; and,
   g) an elongate solids transport line, connected at one end to said pipecross chamber main lower outlet, and connected at its other end to said pump exhaust line such that the longitudinal axis of said solids transport line intersects the longitudinal axis of said pump exhaust line at an acute angle,
   whereby entrained solids are separated from said fluid in said pipecross chamber, said separated solids exiting said pipecross chamber through said main lower outlet, and passing through said solids transport line into said pump exhaust line, thereby being remixed with the fluid which has passed through said centrifugal pump.

2. The apparatus of claim 1 further comprising at least one pipe elbow means having an inlet end and an outlet end; and, at least one means defining a second shear jet, communicating through said pipe elbow wall, and one end of said second jet defining means communicating externally of said pipe elbow, and the other end of said second jet defining means exhausting into said pipe elbow to create a flow in the direction of said pipe elbow outlet end, said second shear jet connected at is distal end to a second jet fluid source which operates at a pressure in excess of the pressure extant within said pipecross chamber, and said pipe elbow means disposed in said solids transport line between said main lower outlet and said pump exhaust line.

* * * * *